United States Patent
Lampérth

(10) Patent No.: US 12,431,747 B2
(45) Date of Patent: Sep. 30, 2025

(54) SINGLE SIDED AXIAL FLUX ELECTRICAL MACHINE WITH ADDITIONAL PASSIVE STATOR

(71) Applicant: PHI-POWER AG, Pfäffikon ZH (CH)

(72) Inventor: Michael Lampérth, Fehraltorf (CH)

(73) Assignee: PHI-POWER AG, Pfäffikon Zh (CH)

( * ) Notice: Subject to any disclaimer, the term of this patent is extended or adjusted under 35 U.S.C. 154(b) by 668 days.

(21) Appl. No.: 17/782,637

(22) PCT Filed: Dec. 4, 2020

(86) PCT No.: PCT/EP2020/084698
§ 371 (c)(1),
(2) Date: Jun. 3, 2022

(87) PCT Pub. No.: WO2021/110948
PCT Pub. Date: Jun. 10, 2021

(65) Prior Publication Data
US 2023/0032576 A1    Feb. 2, 2023

(30) Foreign Application Priority Data

Dec. 5, 2019   (EP) ..................... 19213815

(51) Int. Cl.
*H02K 1/27*    (2022.01)
*H02K 1/02*    (2006.01)
(Continued)

(52) U.S. Cl.
CPC .............. *H02K 1/27* (2013.01); *H02K 1/02* (2013.01); *H02K 1/2796* (2022.01); *H02K 7/003* (2013.01); *H02K 16/04* (2013.01)

(58) Field of Classification Search
CPC .......... H02K 1/27; H02K 1/02; H02K 1/2796; H02K 7/003; H02K 16/04; H02K 21/025;
(Continued)

(56) References Cited

U.S. PATENT DOCUMENTS 4,837,467 A    6/1989  Newman
7,432,623 B2   10/2008 Ritz, Jr. et al.
(Continued)

FOREIGN PATENT DOCUMENTS

EP    0660494 A1    6/1995
FR    3022708 A1    12/2015
(Continued)

OTHER PUBLICATIONS

Article "Assessment of Axial Flux Motor Technology for Hybrid Powertrain Integration" authored by M. U. Lampérth et al. published in 2015 in World Electric Vehicle Journal vol. 7—ISSN 2032-6653, at p. WEVJ7-0187 et al., in English, 8 pgs.
(Continued)

*Primary Examiner* — Christopher M Koehler
*Assistant Examiner* — Riley Owen Stout
(74) *Attorney, Agent, or Firm* — Hassan Abbas Shakir; Shakir Law PLLC

(57) ABSTRACT

An electrical machine includes a first stator core and a plurality of windings, and a movable element that is movably mounted adjacent to the first stator to form a first air gap between the movable element and the windings of the first stator. The movable element is a slider or a rotor connected to a shaft. A second stator includes a stator core arranged opposite to the first stator on the other side of the movable element. The movable element is movably mounted adjacent to the second stator to form a second air gap between the movable element and the stator core of the second stator. The first stator, the second stator and the movable element are arranged to pass the magnetic flux passes from the first stator through the first air gap, through the movable element and through the second air gap to the second stator.

20 Claims, 12 Drawing Sheets

(51) Int. Cl.
*H02K 1/2796* (2022.01)
*H02K 7/00* (2006.01)
*H02K 16/04* (2006.01)

(58) Field of Classification Search
CPC . H02K 21/026; H02K 2201/03; H02K 41/031
See application file for complete search history.

(56) References Cited

U.S. PATENT DOCUMENTS

| | | |
|---|---|---|
| 2007/0046124 A1 | 3/2007 | Aydin et al. |
| 2009/0134723 A1* | 5/2009 | Takeuchi ............ H02K 21/026 310/48 |
| 2010/0071672 A1 | 3/2010 | Grunwald et al. |
| 2010/0071972 A1 | 3/2010 | Lamperth et al. |
| 2011/0083467 A1 | 4/2011 | Asano et al. |
| 2011/0101813 A1 | 5/2011 | Tbatou |
| 2015/0171722 A1 | 6/2015 | Hon et al. |
| 2019/0002214 A1 | 1/2019 | Weber |
| 2019/0241368 A1 | 8/2019 | Sazawa |

FOREIGN PATENT DOCUMENTS

| | | |
|---|---|---|
| JP | H10243589 A | 9/1998 |
| JP | 2008220128 A | 9/2008 |
| JP | 2011130565 A | 6/2011 |
| JP | 2011254682 A | 12/2011 |
| JP | 5 365074 B2 | 12/2013 |
| WO | 01/11755 A1 | 2/2001 |
| WO | 2008/006906 A1 | 1/2008 |
| WO | 2009/087376 A2 | 7/2009 |
| WO | 2012/059753 A1 | 5/2012 |
| WO | 2014/108111 A2 | 7/2014 |
| WO | 2018/003990 A2 | 8/2018 |

OTHER PUBLICATIONS

International Search Report for related patent application PCT/EP2020/084698 prepared by the European Patent Office and mailed Jan. 22, 2021, in English, 4 pgs.

Written Opinion of the International Searching Authority for related patent application PCT/EP2020/084698 prepared by the European Patent Office and published by WIPO Patentscope at patentscope.wipo.int/search/en/detail.jsf?docId=WO2021110948&_cid=P20-L3YJSB-13274-1 on Jun. 10, 2021, in English, 8 pgs.

European Search Report for related patent application EP 19213815 prepared by the European Patent Office and mailed May 26, 2020, in English, 2 pgs.

European Search Opinion for related patent application EP 19213815 prepared by the European Patent Office and mailed May 26, 2020, in English, 7 pgs.

Office Action in related EPO patent application 19 213 815.4-1202 dated Sep. 12, 2023 issued by the European Patent Office, 7 pgs., in English.

Office Action in related Indian patent application 202247032030 dated Nov. 9, 2022 issued by the Indian Patent Office, 6 pgs., in English.

* cited by examiner

SINGLE SIDED AXIAL FLUX ELECTRICAL MACHINE WITH ADDITIONAL PASSIVE STATOR

CROSS-REFERENCE TO RELATED APPLICATIONS

This application is a national stage under 35 U.S.C. § 371 of PCT patent application PCT/EP2020/084698 filed on 4 Dec. 2020, which is pending and which is hereby incorporated by reference in its entirety for all purposes. PCT/EP2020/084698 claims priority to European Patent Application 19213815.4 filed on 5 Dec. 2019, which is hereby incorporated by reference in its entirety for all purposes.

BACKGROUND OF THE INVENTION

1. Field of the Invention

The present invention relates to an electrical machine, a vehicle comprising an electrical machine and a method for controlling the operation of an electrical machine.

2. Discussion of the Related Art

Electrical machines that are used as electric motors or generators can convert electrical energy into mechanical energy and vice versa, wherein the underlying physical principles are well known in the art. A broad variety of different technical designs exists for electrical machines, wherein most types operate through the interaction between a magnetic field and electric current in a wire winding to generate mechanical forces. In recent years, electrical machines and their development have attracted a lot of attention, as they are expected to play an important role for improving the performance of electric and hybrid vehicles. Enhanced electrical machines could provide a significant contribution to reducing the dependence on petroleum-based fuels, while at the same time allowing for a more sustainable management of global resources. Correspondingly, comprehensive research was conducted in the field to arrive at improved electrical machines.

Among the electrical machines known in the art, axial flux electrical machines are often considered to be particularly promising, especially in comparison to radial flux electrical machines. An axial flux electrical machine is a motor or generator with at least one rotor and at least one stator in which the magnetic flux between the rotor and the stator is parallel to the axis of rotation of the rotor.

Axial flux electrical machines have been used in niche automotive applications for many years where their shape and compactness offer specific benefits, for example when used as integrated electrical machines for hybrid powertrains. Overall market acceptance for axial flux electrical machines increased over the last decade, as they are known to offer excellent power and torque densities.

The basic concept of axial flux electrical machines is well known in the art, though there are variations with respect to the mechanical and electro-magnetic designs, namely; permanent magnet, interior permanent magnet, induction, brushed DC and switched reluctance machines. In principle, axial flux electrical machines can be designed with a single rotor and a single stator (often referred to as "single-sided" design), with a single rotor in between two stators (often referred to as "central rotor" design) or with a single stator in between two rotors (often referred to as "central stator" design). A good introduction into the general technical background and an overview about the knowledge of the skilled person is provided in the article "Assessment of Axial Flux Motor Technology for Hybrid Powertrain Integration" by M. U. Lamperth et al. for the EVS 28 International Electric Vehicle Symposium and Exhibition, Kintex, Korea, May 3-6, 2015.

Axial flux electrical machines are known from the prior art. For example, WO 01/11755 A1 discloses a central rotor axial flux electrical machine. In particular, an electric axial flow machine is disclosed, comprising an ironless disc-shaped rotor, which is arranged on a machine shaft, and two stators, which are arranged next to the rotor, wherein the rotor comprises permanent magnets which are embedded in a fiber-reinforced or fabric-reinforced plastic and wherein the permanent magnets are each joined with positive fit to the surrounding plastic to form a dimensionally stable unit with the machine shaft.

WO 20018/003990 A2 discloses an axial flux electrical machine including a rotor mounted adjacent at least one stator, the rotor being mounted on a rotatable member for rotation relative to the stator such that the rotor and stator form a first rotor-stator module of the machine, wherein the machine includes a plurality of rotor-stator modules each substantially as the first module and axially-adjacent thereto, with each rotor being mounted on the rotatable member.

WO 2009/087376 A2 discloses a rotor for an axial flux electrical machine, the rotor having a plurality of permanent magnets fixed thereto, wherein each of the plurality of magnets extends at least partly through an aperture in the rotor, the arrangement being such that material of the rotor abuts the magnet so as to locate the magnet substantially circumferentially with respect to the axis of rotation of the rotor and substantially axially in at least one axial direction.

Further prior art is disclosed in WO 2012/059753 A1, US 2009/134723 A1, WO 2008/006906 A1, EP 0660494 A1, US 2007/046124 A1, US 2010/071972 A1, FR 3022708 A1, JP H10243589 A, US 2015/171722 A1, US 2019/002214 A1 and WO 2014/108111 A2.

For most applications in electrical and hybrid vehicles, it is desirable to minimise the size and weight of the electrical machine. At the same time, these applications also require a high power output of the electrical machines that should at least be comparable to that of conventional engines in order to ensure consumer acceptance. Therefore, axial flux electrical machines with a high power density, i.e. power per volume or power per mass, are desirable.

Axial flux electrical machines with central stator design require rotors with rotor yokes that can function as return paths for the magnetic flux. While these electrical machines are very compact and do not require a stator yoke, i.e. a path for the magnetic flux in the central stator, the two rotating disks at its sides often make integration into vehicles and sufficient cooling, in particular indirect cooling, of the electrical machine comparably challenging, wherein in particular the rotor yoke can suffer from undesirable heat build-up. Furthermore, the rotor inherently needs to be laminated in order to minimise eddy currents and hysteresis losses.

With respect to convenient integration of the electrical machine into vehicles and efficient cooling, axial flux electrical machines with central rotor design are often preferably. In these electrical machines, the magnetic flux passes from the first stator through the rotor to the second stator, wherein the second stator (like in the first stator) acts as a return path for the magnetic flux for closing the magnetic circuit. In this technical design two stationary stator rear faces are available for fitting the electrical machine into a vehicle and for arranging cooling elements.

Despite the several benefits of axial flux electrical machines with central rotor design, these electrical machines consist of a lot of different parts and often are found to be comparably difficult to assemble or to maintain. Most importantly, axial flux electrical machines with central rotor design can be comparably heavy.

In principle, the most favourable type of axial flux electrical machines with respect to the number of required parts and weight of the machine are those electrical machines with a single-sided design. However, due to the fact that these machines only circulate the magnetic flux between a single stator and a single rotor, they in most cases also offer the lowest power. Furthermore, only one side of the machine is formed by a stationary stator, adversely affecting both the incorporation into a vehicle and the cooling efficiency when compared to the central rotor design. However, the most important drawback of these machines is the strong attraction force between the rotor and the stator which can be several kN in magnitude. This strong attraction force often leads to increased wear in the electrical machine, e.g. of the bearings that connect the stator with the shaft, reduces its resistance to impacts or other external forces and results in technical defects often having comparably severe, i.e. dangerous and damaging, effects on the electrical machine and/or the vehicle.

OBJECT OF THE INVENTION

In view of the above described problems, there was a long-felt need to overcome the respective disadvantages of the prior art designs for electrical machines. It was a primary objective of the present invention to provide a lightweight electrical machine that features high power densities and/or can provide for large torque. It was another objective of the present invention to provide an electrical machine that requires a reduced amount of parts and can be assembled and maintained in an easy and cost efficient way. In particular, it was an objective of the present invention to provide an electrical machine that does not have strong attraction forces between its parts that could adversely affect the wear resistance or reduce the operational safety. It was a further objective of the present invention to provide an electrical machine that can be provided with stationary parts on both ends to allow for easy incorporation into a vehicle, in particular into a hybrid powertrain, and enable an efficient cooling of the electrical machine.

It was a secondary objective of the present invention to provide an electrical machine that allows for adjusting its properties during operation by manipulating the magnetic flux in the electrical machine and to provide a corresponding method of controlling the operation of such an electrical machine. Finally, it was a secondary objective of the present invention to provide a vehicle comprising the respective electrical machine.

The above described objectives are solved by the subject-matter of the invention.

Surprisingly, the inventors have found that all of the above described problems of the prior art designs can be overcome with the usage of a specific stator design, that hereinafter is also referred to as passive stator. A passive stator does not comprise windings itself and in its most basic form only consists of a stator core, with optional components like for example cooling systems. Starting from the single-sided design described above, the inventors found that the addition of a passive stator solves the above described problems, if the passive stator is arranged opposite to the first stator, i.e. the active stator comprising the windings, on the other side of the rotor. This arrangement has the effect that the magnetic flux no longer circulates between the active stator and the rotor, thereby causing large attraction forces. Instead, the magnetic circuit of the electrical machine is changed so that the magnetic flux passes from the active stator through the rotor to the passive stator, that acts as a return path for the magnetic flux, thereby e.g. removing the need for a rotor yoke, i.e. the backbone of the rotor that is used as return path for the magnetic flux in the single-sided design, thus allowing the use of the same rotors as for a central rotor axial flux electrical machine.

In comparison with an active stator, the passive stator does not comprise windings and does not require any wiring. Therefore, the passive stator can be designed to be very light, simple, robust and easy to assemble. In combination with the removal of the rotor yoke, this finding allows for a particularly lightweight electrical machine that can be build using a comparably low number of parts. At the same time, the resulting electrical machine has the same amount of air gaps as an electrical machine with a central rotor design and also features two stationary elements at its ends that shield the moving rotor, allow for an efficient cooling, facilitate safe operation and enable a convenient incorporation into vehicles. As the axial force on the rotor is greatly reduced, this design allows for high strength magnets to be used, resulting in high torque and power to weight ratios. Furthermore, as only one set of stator slots, that means the structures in the stator that are designed for housing the windings, is needed, the machine length can be reduced by the length of the tooth-tip of the stator tooth (i.e. the inward-bent terminal protrusions at the end of the stator tooth that are typically forming the stator slots).

The inventors found that the properties of such an electrical machine can safely be manipulated even during operation of the electrical machine by moving the passive stator relative to the rotor, corresponding to a mechanical field weakening that is caused by the alteration of the air gaps in the magnetic circuit of the electrical machine.

Without wishing to be bound by theory, the high reliability of the passive stator design found by the inventors can be understood when considering the magnetic circuit of the passive stator design compared to the magnetic circuit of a single-sided design. When describing magnetic circuits in analogy to electric circuits, the magnetic reluctance, or magnetic resistance, corresponds to the electrical resistance. As for a corresponding electrical circuit, the highest resistance, i.e. magnetic reluctance, in the electrical machine is expected to be caused by the air gaps, i.e. the free space or clearance between the components of the magnetic circuit. The skilled person understands that problems in the operation of an electrical machine are primarily associated with undesired and/or unexpected changes in the system. As the comparatively small air gaps typically are the main contributors to the magnetic reluctance, small deviations in the distance between the moving rotor and the active stator, i.e. small changes in the size of the air gap, can cause large variations in the magnetic reluctance associated with the air gaps, thereby severely altering the distribution of magnetic reluctance in the magnetic circuit. In clear contrast, in the passive stator design, the magnetic flux passes from the active stator through the first air gap, through the rotor and through the second air gap to the passive stator, wherein the second stator acts as a return path for the magnetic flux that correspondingly returns through the second air gap, the rotor and the first air gap towards the active stator. Independent of any imperfections or deviation in the operation of the moving rotor, the total air gap, i.e. the sum of the first and second air gap as well as the rotor thickness will always remain constant between the two stationary components (unless deliberately changed as a method for controlling the electrical machine), i.e. between the active and the passive stator, resulting in a beneficially stable and reliable electrical machine. Insofar it is noted that the term air gap as used in some prior art documents sometimes corresponds to the total air gap calculated as the sum of the rotor thickness as well as the first and second air gap that are used in the framework of the present invention for describing the electrical machine. In the context of the present invention the first and second air gap correspond to the actual space between the rotor and the active or passive stator, respectively, that are sometimes also called mechanical air gaps by the skilled person.

The present invention was conceived during the development of improved axial flux electrical machines, as described above. However, the inventors found that the inventive concept of a passive stator can also be applied to linear electric machines without modifications, as these electrical machines have several features in common with axial flux electrical machines. All the above described benefits can be obtained for linear electrical machines, if a passive stator comprising a stator core is arranged opposite to the active stator on the other side of the slider of a single-sided linear machine.

DETAILED DESCRIPTION OF THE INVENTION

Figure 1:
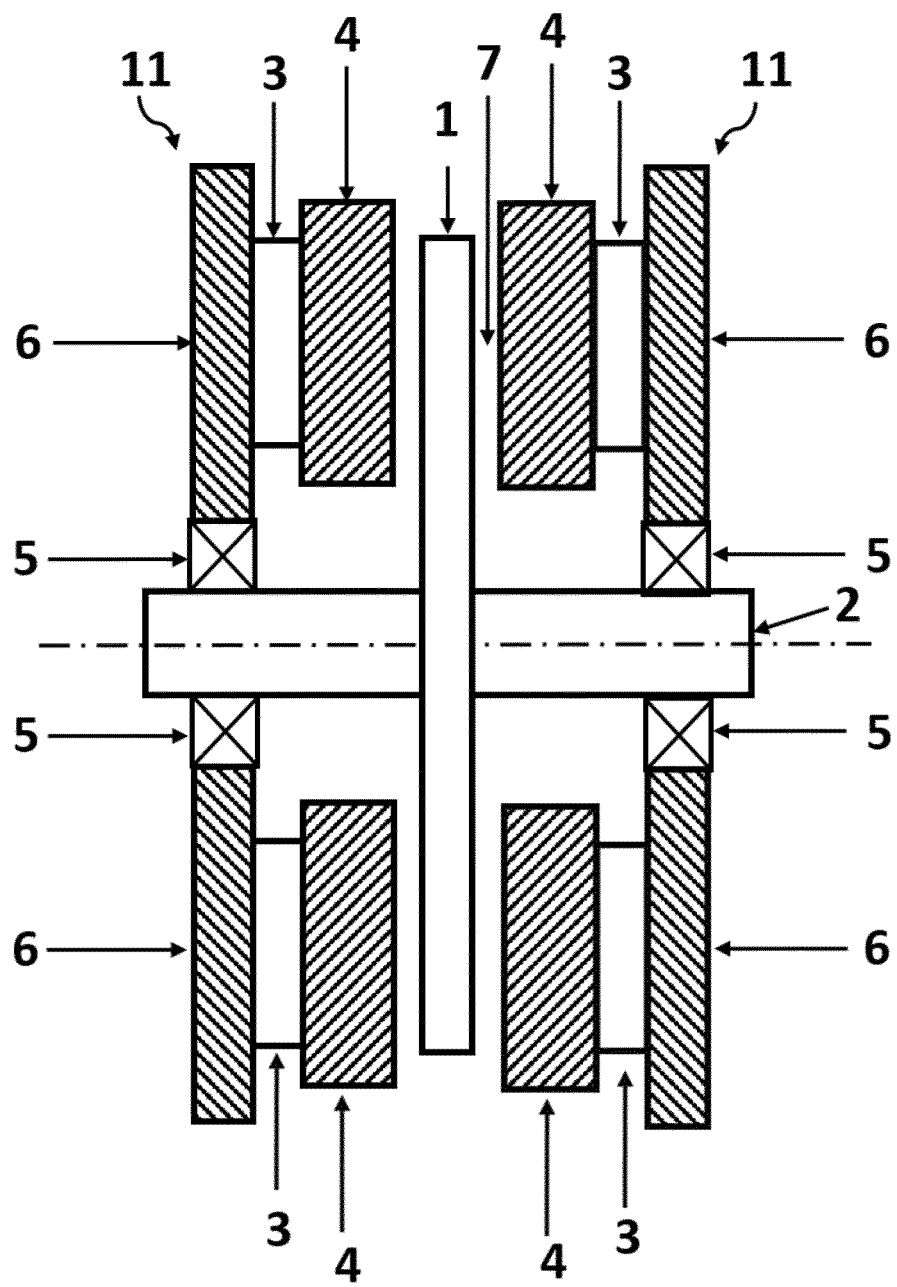
FIG. 1: A cross-sectional view through a schematic axial flux electrical machine having a central rotor design with two active stators.

Hereinafter, the subject-matter of the invention is discussed in more detail, wherein preferred embodiments of the invention are disclosed. In order to avoid any ambiguities that could be caused by the figurative terms "active stator" and "passive stator", the invention is hereinafter disclosed using the terms first stator, i.e. the active stator as described above, and second stator, i.e. the passive stator described above. Hereinafter, it is particularly preferred to combine two or more preferred embodiments to obtain an especially preferred embodiment. Correspondingly, especially preferred is an electrical machine according to the invention, that defines two or more features of preferred embodiments of the present invention.

The invention relates to an electrical machine comprising:
a first stator comprising a stator core and a plurality of windings, and
a movable element that is movably mounted adjacent to the first stator to form a first air gap between the movable element and the windings of the first stator,
wherein the movable element is a slider or a rotor that is connected to a shaft,
wherein a second stator comprising a stator core is arranged opposite to the first stator on the other side of the movable element,
wherein the movable element is movably mounted adjacent to the second stator to form a second air gap between the movable element and the stator core of the second stator,
wherein the first stator, the second stator and the movable element are arranged so that during operation of the electrical machine the magnetic flux passes from the first stator through the first air gap, through the movable element and through the second air gap to the second stator, wherein the second stator acts as a return path for the magnetic flux.

The first stator comprises a plurality of windings, preferably two or more, more preferably three or more, most preferably four or more. Suitable windings are well known in the art and consist of windings of an electrical conductor that comprise e.g. copper and/or iron. The windings can be connected to a power source and are used to generate the magnetic fields that drive the electrical machine. The windings are typically arranged on the surface of the first stator that faces towards the movable element, wherein the windings are preferably arranged in a symmetric pattern. Even more preferably, the first stator comprises a plurality of stator slots that are designed for fixating the windings, wherein preferably the stator slots are formed by protrusions on the surface of the second stator, the so called stator tooth that preferably confine the stator slots with terminal tooth-tips.

The first and second stator each comprise a stator core that typically consist of materials that have a low magnetic reluctance, e.g. iron or steel, to allow for the magnetic flux to flow though the stator core, thereby functioning as a stator yoke. In case of the first stator, the windings are preferably arranged on the surface of the stator core or in apertures in the stator core that are designed for housing the windings. The second stator is typically laminated with the material having low magnetic reluctance, in order to minimise eddy currents and hysteresis losses.

The movable element is either a slider or a rotor that is connected to a shaft. In the first alternative the electrical machine is a linear electrical machine and in case of the second alternative it is an axial flux electrical machine. In most cases the movable element will comprise one or more magnetic elements, e.g. permanent magnets or windings, preferably permanent magnets. Preferably the rotor is of a magnetically and/or electrically insulating material. This assists in avoiding losses in the rotor, such as losses due to eddy currents, and assists in avoiding magnetic short circuits in the flux path. The rotor may be of a heat insulating material and may be resistant to high temperatures.

The movable element is movably mounted adjacent to the first stator to form a first air gap between the movable element and the windings of the first stator. Furthermore, the electrical machine comprises a second stator that is arranged opposite to the first stator on the other side of the movable element, wherein the movable element is movably mounted adjacent to the second stator to form a second air gap between the movable element and the stator core of the second stator.

Movably mounted means that the movable element has at least one degree of freedom with respect to the stator, either rotational or translational. In case of an axial flux electrical machine the rotor can rotate around the axis of the shaft, while the slider of a linear electrical machine has at least one translational degree of freedom.

Within the framework of the present invention, the term adjacent needs to be construed to mean that the two elements that are adjacent to each other are arranged in vicinity to each other, without actually being in contact, thereby forming an air gap that is sufficiently broad to allow for a free movement of the components relative to each other, even during operation at high speeds. Typical air gaps between the movable element and the first or second stator are in the range of 0.3 to 2.5 mm. Therefore, the closest distance between the movable element and the first and/or second stator is preferably in the range of 0.3 to 2.5. Preferably, the first and second air gaps between the movable element and the first and second stator, respectively, are essentially of the same size.

Furthermore, within the framework of the present invention, the terms first and second air gap refer to the actual space between the movable element and the first or second stator, respectively. The first and second air gap describe the part of the gap between the movable element and the respective stator, where during operation the magnetic flux passes from one structure to the other, i.e. typically the pathway of lowest magnetic reluctance. This is in agreement with the understanding of the skilled person. For example, if the distance between the rotor and the windings of the first stator is A and the distance between the rotor and the stator core of the first stator underneath the windings is B, wherein A<<B, the air gap is the gap formed between the windings and the rotor and not between the rotor and the stator core of the first stator.

An air gap that comprises one or more additional elements between the movable element and the stator can also be considered an air gap, as long as the contribution of the additional element to the total magnetic reluctance between the movable element and the respective stator is less than 5%. For example, a protective coating that is covering the windings or a thin fabric between the stator and the slider would not affect the status of the clearance between the elements to be a first or second air gap.

Likewise, in agreement with the understanding of the skilled person, the term air gap defines the space between two elements and does not define that it is actually filled with air. For example, an air gap that is filled with a liquid cooling fluid or a different gas would still be an air gap within the meaning of the present invention.

However, preferred is an electrical machine according to the invention, wherein the movable element is only separated from the windings of the first stator by the first air gap and only separated from the stator core of the second stator by the second air gap, so that during operation the magnetic flux passes from one stator to the other through the first and second air gap as well as the movable element without passing through any additional condensed matter.

According to the invention, the first air gap is formed between the movable element and the windings of the first stator and the second air gap is formed between the movable element and the stator core of the second stator. Taking into account the skilled persons understanding of the term air gap set out above, this means that the second stator comprises no winding that would contribute to the flow of the magnetic flux in the electrical machine. The most basic case is, that the second stator does not comprise any windings.

According to the invention the first stator, the second stator and the movable element are arranged so that during operation of the electrical machine the magnetic flux passes from the first stator through the first air gap, through the movable element and through the second air gap to the second stator, wherein the second stator acts as a return path for the magnetic flux. This feature emphasizes that the electrical machine of the invention needs to be operational and that e.g. any arbitrary placements of the second stator are not considered to be according to the invention. Furthermore, it follows that almost no magnetic flux, that means less than 2% of the magnetic flux, preferably no magnetic flux, turns in the movable element itself in order to directly flow back to the first stator. Correspondingly, the moveable element does not require a yoke. Finally, this feature also excludes electrical machines that circulate the magnetic flux exclusively, or at least mostly, that means to more than 10%, between the first stator and the movable element, like for example external-rotor motors or single-sided electrical machines. In agreement with the skilled person's understanding, the term return path means that the magnetic flux that enters the stator core of the second stator circulates through, that means flows through, the stator core in order to exit the stator core of the second stator at a different location, so that it can pass back to the first stator by passing through the second air gap, the movable element and the first air gap.

Preferred is an electrical machine according to the invention, wherein the second stator comprises no windings on the surface facing the movable element, and/or
  wherein the movable element comprises no yoke as return path for the magnetic flux.

By excluding the respective components, the most basic embodiment of the present invention, that is particular cheap and requires a minimum of valuable resources like copper, can be obtained. Furthermore, the effort of winding two stators is reduced.

The skilled person understands that a further aspect of the invention can be expressed using the above features, eliminating the need to refer to the air gaps.

Correspondingly an electrical machine is disclosed comprising:
  a first stator comprising a stator core and a plurality of windings, and
  a movable element that is movably mounted adjacent to the first stator,
  wherein the movable element is a slider or a rotor that is connected to a shaft, wherein a second stator comprising a stator core is arranged opposite to the first stator on the other side of the movable element, wherein the movable element is movably mounted adjacent to the second stator, wherein the second stator comprises no windings on the surface facing the movable element and wherein the movable element comprises no yoke as return path for the magnetic flux, wherein the first stator, the second stator and the movable element are arranged so that during operation of the electrical machine the magnetic flux passes from the first stator through the movable element to the second stator, wherein the second stator acts as a return path for the magnetic flux.

As discussed above, the concept of the present invention can be efficiently applied to axial flux electrical machines and linear electrical machines. Correspondingly, preferred is an electrical machine according to the invention, wherein the electrical machine is an axial flux electrical machine, wherein the movable element is a rotor that is connected to a shaft and rotatably mounted between the first stator and the second stator, or wherein the electrical machine is a linear electrical machine, wherein the movable element is a slider that is movably mounted between the first stator and the second stator.

Preferred is an electrical machine according to the invention, wherein the movable element comprises two or more permanent magnets, wherein preferably the permanent magnets are arranged so that the polarity of each is opposite that of each immediately neighbouring magnet. Suitable permanent magnets are known in the art. Electrical machines with permanent magnets have proven to be very robust and are comparably easy to manufacture. The usage of permanent magnets requires no additional wiring in the rotor. With respect to the performance of the electrical machine it was found beneficial to provide for a high density of magnets on the movable element. As an economically viable alternative, it is preferred to use soft magnetic steel, that means electrical steel or materials with similar magnetic properties, instead of permanent magnets.

Preferred is an electrical machine according to the invention, wherein the movable element is flat and comprises a structure for housing permanent magnets, preferably a disk or plate with apertures for housing permanent magnets, wherein the disk or plate is designed to restrict the movement of the permanent magnets in axial and/or radial direction, preferably in axial and radial direction, wherein most preferably the disk or plate comprises less than 30% by weight of magnetic material, preferably less than 10%, more preferably no magnetic material. As discussed above, no yoke for the magnetic flux is required in the movable element. Therefore, the unfavourable usage of magnetic material, i.e. in most cases a metal, can be avoided in favour of cost efficient and lightweight materials like composite materials or plastics. Furthermore, the thickness of the movable element can be reduced in order to further optimize the weight of the electrical machine. As the permanent magnets in a rotor or slider often experience strong radial forces during operation of the electrical machine, it is beneficial that the movable element comprises a structure for housing the permanent magnets, thereby restricting the translational degrees of freedom of the permanent magnets in axial and/or radial and/or tangential direction, preferably in axial, radial and tangential direction. Most preferably, the permanent magnets are fixated in the movable element so that they cannot detach from the movable element during operation and can transfer the torque or force experienced during operation to the movable element.

Preferred is an electrical machine according to the invention, wherein the movable element is a rotor that is connected to a shaft, wherein the shaft extends through the first and/or second stator, wherein preferably the first and/or second stator is connected to the shaft with a bearing, preferably a roller bearing, to allow rotation of the shaft and the rotor relative to the first and/or second stator. In practice the respective axial flux electrical machines have proven to be beneficial, as the resulting design is very compact and efficient to handle, as the rotor and the first and second stator form a single structure that can e.g. be built into a vehicle without the need for installing additional stator components that would require additional fixation to external structures.

Preferred is an electrical machine according to the invention, wherein the stator core of the first and/or second stator, preferably both stators, comprises one or more materials selected from the group consisting of non-oriented and grain-oriented metal and soft magnetic material, preferably a non-oriented or grain-oriented electrical steel, more preferably a grain-oriented electrical steel. In own experiments the respective materials have proven to be well suited for the electrical machines of the present invention. While non-oriented materials are oftentimes the most cost efficient solution, grain oriented electrical steel was found to be highly promising as it enables the design of specific stator cores with anisotropic magnetic reluctance and/or very low magnetic reluctance along a specific direction that can be fine-tuned to match the pathway of the magnetic flux in the electrical machine.

Preferred is an electrical machine according to the invention, wherein the stator core of the first and/or second stator, preferably of both stators is ring-shaped. The respective shape of the stator core was identified to be an optimized trade-off between reduced weight and costs on the one hand and acceptable performance parameters of the electrical machine on the other hand.

Preferred is an electrical machine according to the invention, wherein the faces of the first and second stator that are facing the movable element and both faces of the movable element are parallel to each other. While other designs are possible, the above design was found to be the most efficient and robust way of designing an electrical machine according to the invention.

Preferred is an electrical machine according to the invention, wherein the second stator is designed so that the distance between the second stator and the movable element can be varied during operation of the electrical machine, wherein the second stator is preferably designed so that the distance between a first portion of the second stator and the movable element can be varied during operation of the electrical machine, independent from the distance between a second portion of the second stator and the movable element.

Due to the magnetic fields produced by the windings of an active stator, that is the first stator of the electrical machine of the present invention, reservations can exist against changing the relative distance between an active stator and a movable element during operation of an electrical machine, in particular for a single-sided design. Yet, it would be interesting to alter the magnetic circuit and therefore the performance characteristics of the electrical machine during operation of the electrical machine by changing the air gap and its magnetic reluctance. A particular benefit of the present invention is that the second stator, i.e. a passive stator that forms the air gap with the movable element through its stator core, can readily be repositioned with respect to the movable element, thereby mechanically changing the magnetic reluctance of the air gaps and the magnetic properties of the electrical machine. It can be considered to be even more beneficial, that the desired effect can be obtained by moving only a portion of the second stator, and correspondingly only a portion of its stator core, relative to the movable element. Typically, this would be the rear part of a two-part stator, i.e. the part that is not facing towards the movable element, that is divided into two portions along a plain that is parallel to the surface of the movable element. The benefit of this design is, that it allows for a modification of the magnetic circuit by effectively modifying the yoke of the second stator, without the need of moving any parts in the direct vicinity of the movable element that moves at high speed and/or exerts strong forces. This reduces the likelihood of failures due to undesired contacts between the movable element and the second stator.

Preferred is an electrical machine according to the invention, wherein the first and/or the second stator comprise means for cooling the electrical machine, preferably cooling plates and/or isolating elements and/or parts of a fluid-based cooling system. The respective electrical machines are beneficial as they make good use of the fact that the electrical machine according to the invention offers two stationary components to position means for cooling.

Preferred is an electrical machine according to the invention, wherein the windings are windings of an electrical conductor that comprise copper and iron, wherein the windings are electrically connected with a power source, wherein preferably the windings are arranged on the surface of the first stator with C2 rotational symmetry or higher, most preferably C6 rotational symmetry or higher. The respective electrical machines are beneficial as the above windings and the corresponding arrangements were found to be particular suitable arrangements and components for the construction of an electrical machine that can provide high power densities. In particular, the usage of windings of an electrical conductor that comprise copper and iron was found to be a cost efficient alternative to silver and other expensive conductors, that still works satisfactorily.

Preferred is an electrical machine according to the invention, wherein the second stator comprises at least one sensor unit, preferably a temperature or hall sensor, preferably a hall sensor for analysing the position of the movable element. Suitable sensor units are well-known in the art. The respective electrical machines are beneficial as the usage of sensors enables for an enhanced control of the electrical machine and allows to gather vital information about the machine during operation. Compared to the other designs of electrical machines that are known in the art, such electrical machines offer a lot more space for placing the respective sensor units as the second stator comprises no windings in the vicinity of the movable element. Furthermore, as the second stator typically comprises no windings and no associated wiring, it is typically possible to significantly reduce the noise that is captured by the sensor units during operation of the electrical machine. Correspondingly, the respective electrical machine provides very accurate measurement results even during operation of the machine.

Using the inventive concept of the present invention it is possible to significantly reduce the attraction force between the first stator and the movable element. In view of the teaching presented herein, the skilled person is readily able to adjust the attraction force to the required level. However, the inventors found that the attraction force should fall below specific thresholds for specific applications to ensure the highest possible degree of safety, wherein this criterion can be measured during testing of the electrical machine. Therefore, an electrical machine according to the invention is preferred, wherein the average distance between the movable element and the first stator that is measured at the circumference of the movable element, changes by less than 5%, preferably less than 2%, most preferably by less than 0.5% between inactive status and operation of the axial flux electrical machine, and/or wherein the axial attraction force between the movable element and the first stator is less than 500 N, preferably less than 100 N.

The electrical machine of the present invention allows for the design of axial flux electrical machines that can generate large torque and feature very high power to volume ratios. In consequence, an electrical machine according to the invention is preferred, wherein the axial flux electrical machine is designed to generate a torque of 200 Nm or more, wherein the axial flux electrical machine preferably has a power to volume ratio of 20 kW/L or more, preferably 30 kW/L or more. Wherein the axial flux electrical machine preferably has a torque to volume ratio of 40 Nm/L or more, preferably 50 Nm/L or more.

In view of the above disclosure, it is apparent that the invention also relates to a method for controlling the operation of an electrical machine according to the invention, comprising the step of:

varying the distance between the second stator and the movable element during operation of the electrical machine in order to control the air gap magnetic flux or the step of varying the distance between a first portion of the second stator and the movable element during operation of the electrical machine, independent from the distance between a second portion of the second stator and the movable element.

Likewise, the invention also relates to a vehicle comprising an electrical machine according to the invention.

Hereinafter, the invention is explained in more detail with respect to the figures. FIGS. 1 to 12 show cross-sectional views through schematic, exemplary electrical machines that shall facilitate the understanding of the present invention. For the axial flux electrical machines of FIGS. 1, 3, 5, 7, 9 and 11 this means that the figures show a cross-sectional view through a round structure that means, that the rotor 2 is a round plate, while the cooling plates 6, the bearings 5 and the stator core 3 are actually ring-shaped, wherein a plurality of windings 4 is arranged over the entire circumference of the ring-shaped stator core 3. In FIGS. 7 to 12, black arrows give a qualitative indication of the magnetic flux in the different electrical machines, while double arrows indicate that the position of the second stator 12 can be varied. The qualitative indication of the magnetic flux is limited by the restraints of the cross sectional view. It should be understood that the magnetic flux flows through the ring-shaped stator core 3 and will not pass through the centre of the ring-shaped stator core 3 or the shaft 2 of the machine. In any case, the qualitative indication of the magnetic flux is meant to facilitate understanding of the invention and should not be construed to be limiting in any way.

Figure 2:
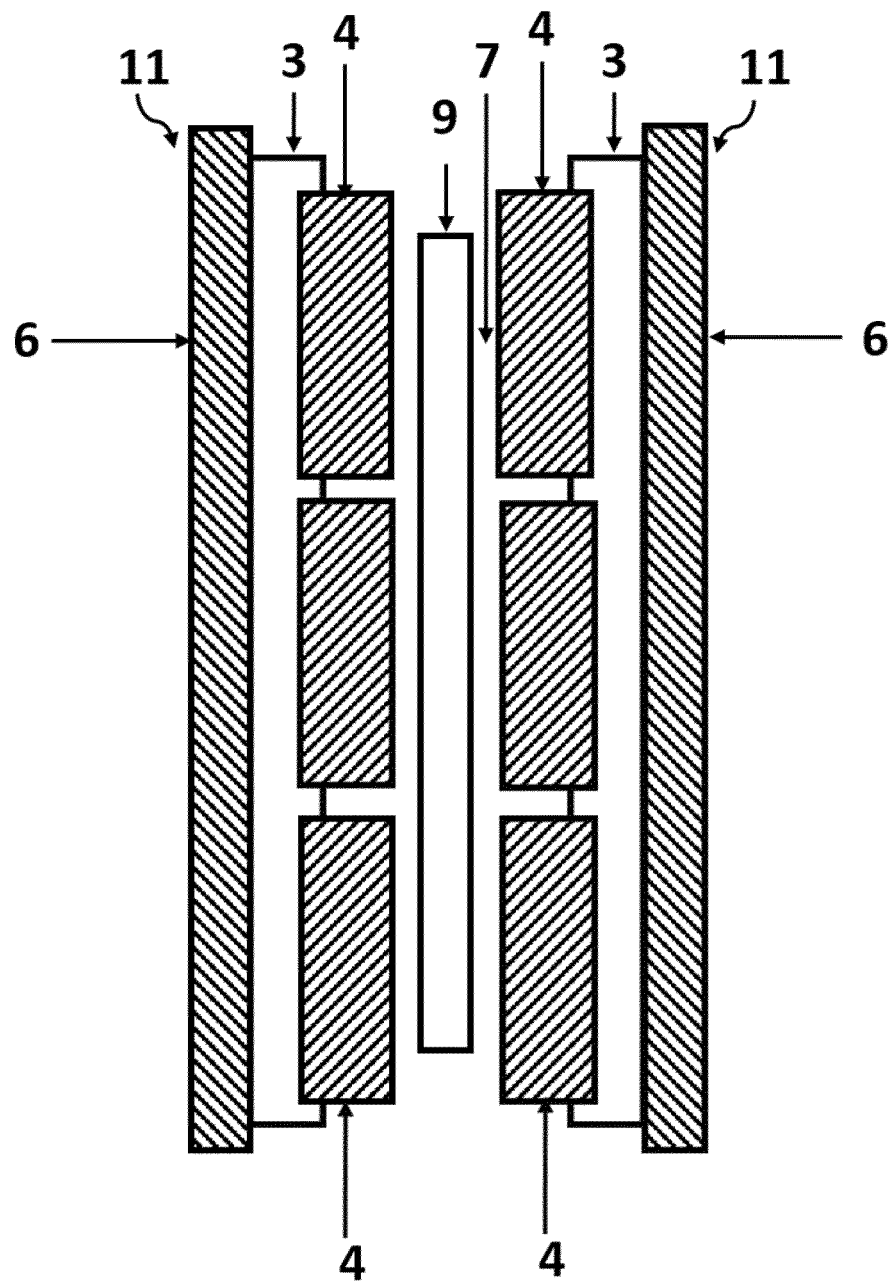
FIG. 2: A cross-sectional view through a schematic linear electrical machine with two active stators.

FIG. 1 depicts a prior art axial flux electrical machine having a central rotor design. The rotor 1 is sandwiched between two first stators 11, that comprise a plurality of windings 4 and a stator core 3 as well as a cooling plate 6 that supports the stator core 3 and is connected to the shaft 2 through bearings 5 in order to allow for the rotor to be movably mounted adjacent to the first stator to form a first air gap 7 between the movable element and the windings 4 of the first stator 11. FIG. 2 shows the corresponding linear electrical machine with a slider 9 that is sandwiched between two first stators 11.

Figure 3:
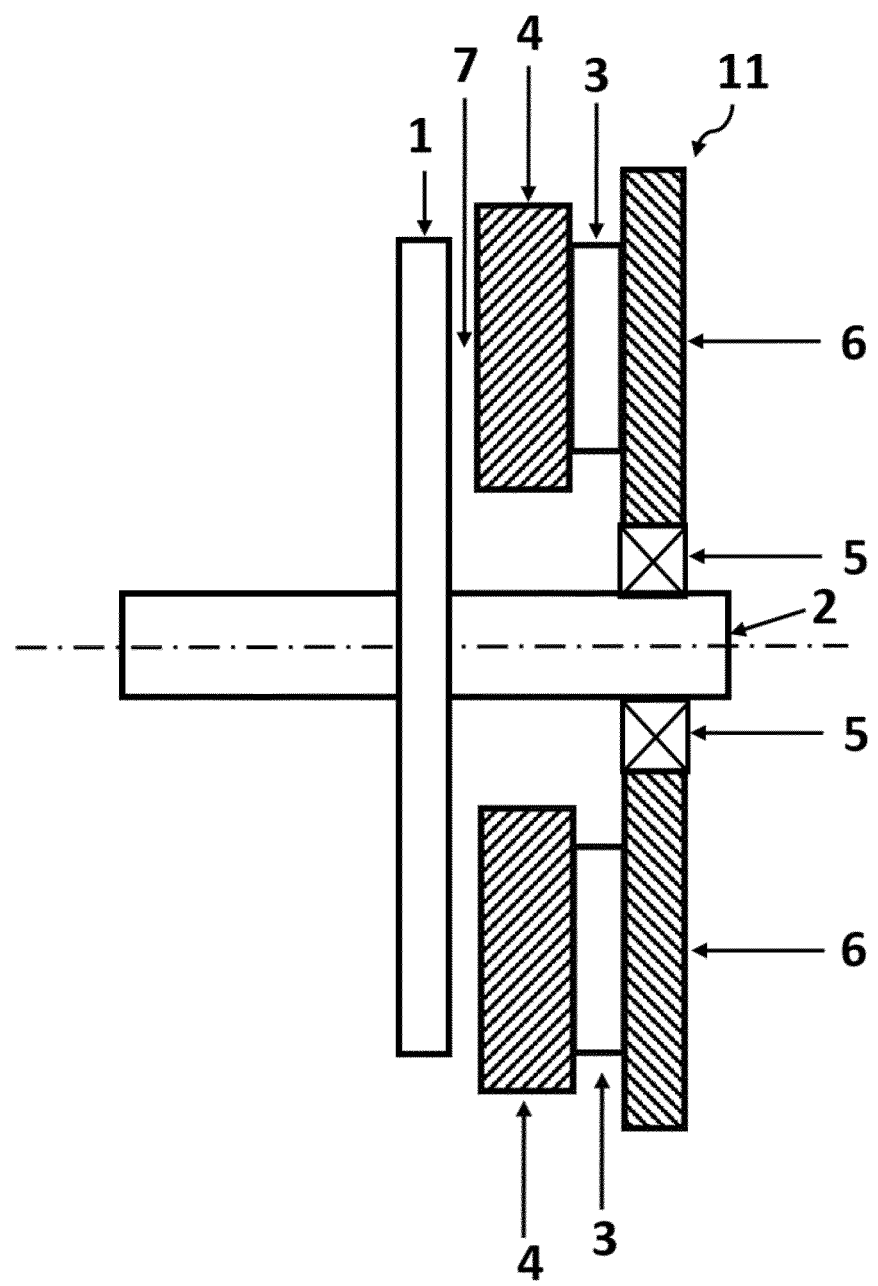
FIG. 3: A cross-sectional view through a schematic axial flux electrical machine with single-sided design with one active stator.
Figure 4:
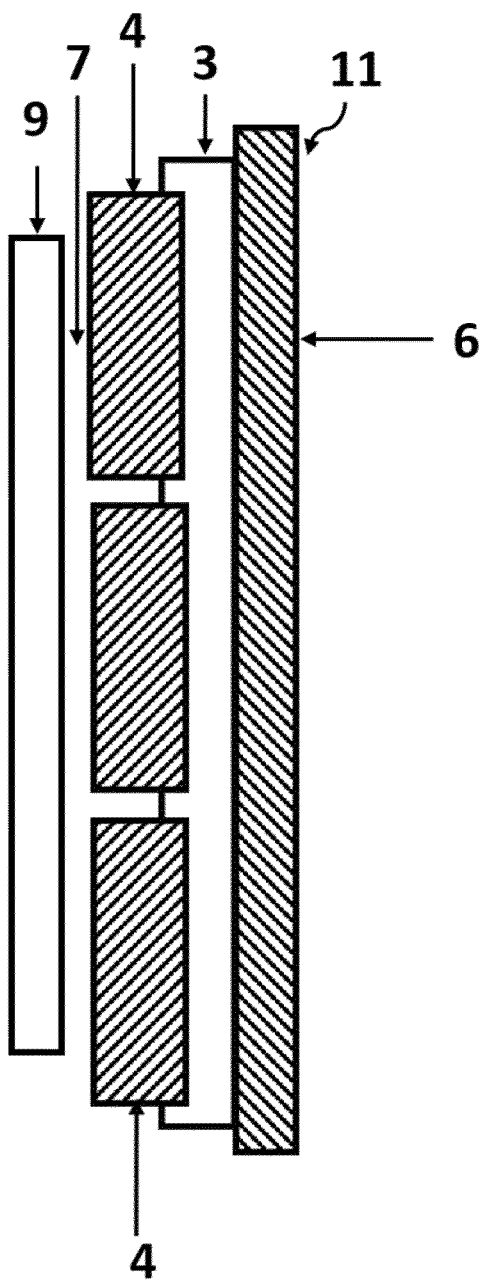
FIG. 4: A cross-sectional view through a schematic linear electrical machine with one active stator.

The single-sided design for these electrical machines is obtained when one of the active stators 11 is removed, leaving only one movable element that is movably mounted adjacent to the first stator 11 to form a first air gap 7 between the movable element and the windings 4 of the first stator 11. A schematic representation of these single-sided designs is shown in FIGS. 3 and 4, wherein FIGS. 7 and 8 also provide qualitative indication of the magnetic flux in the respective electrical machines.

Figure 5:
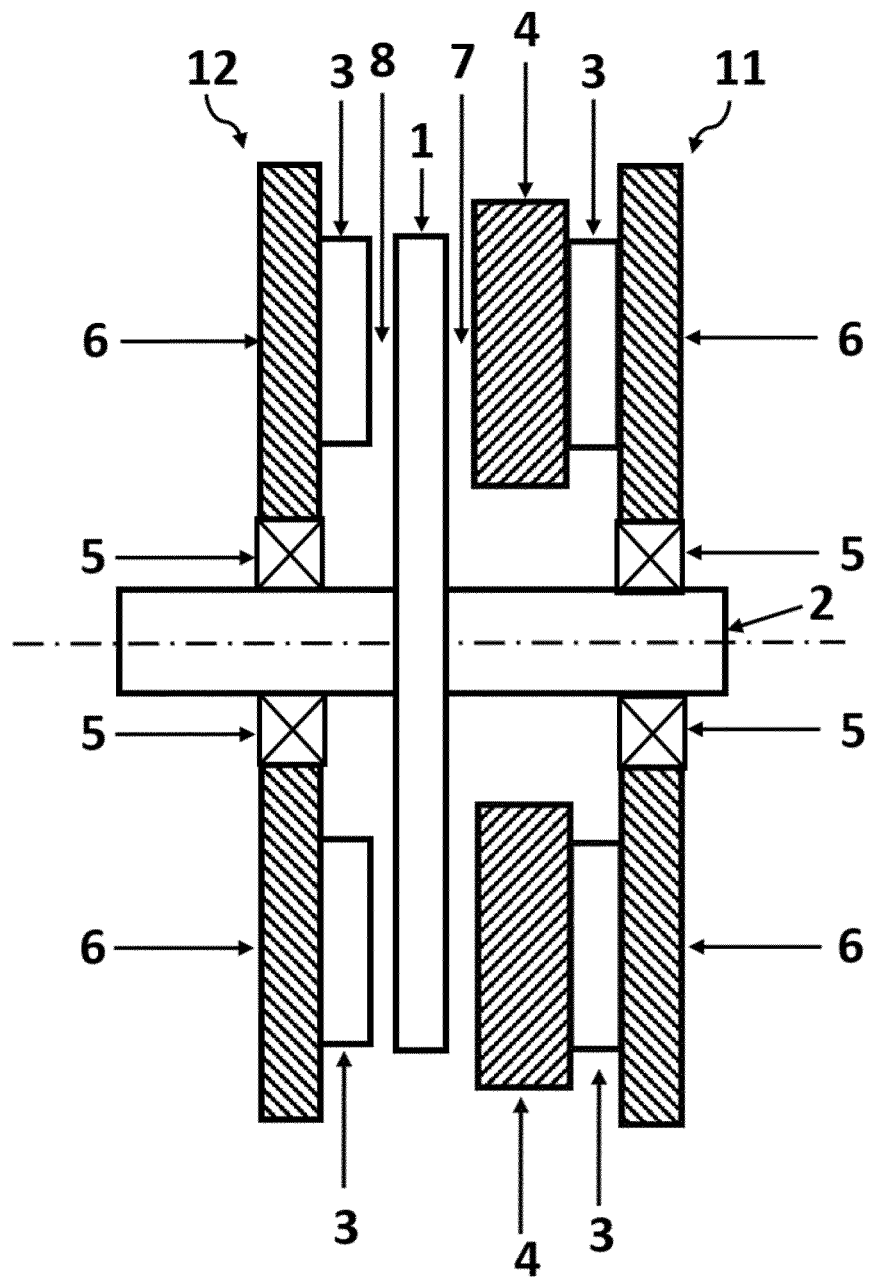
FIG. 5: A cross-sectional view through a schematic axial flux electrical machine according to the invention.
Figure 6:
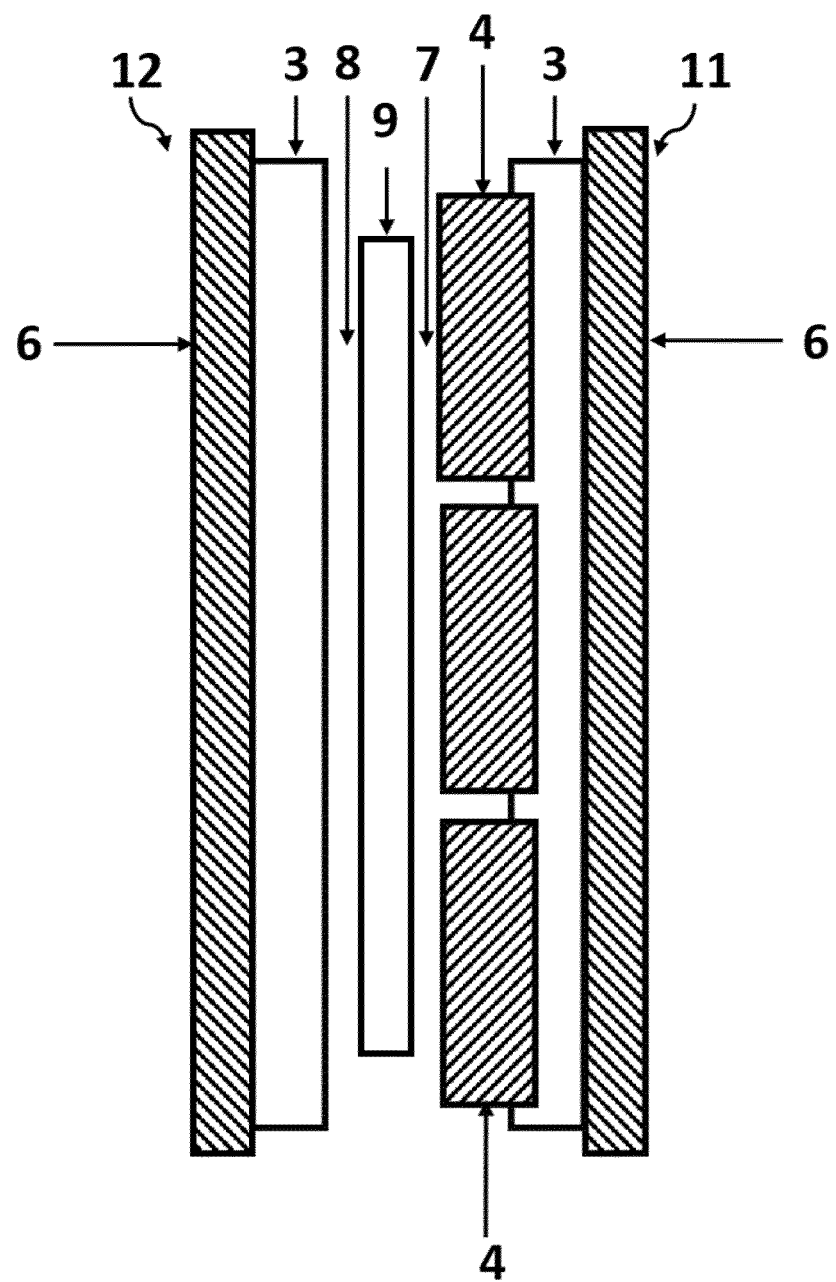
FIG. 6: A cross-sectional view through a schematic linear electrical machine according to the invention.
Figure 7:
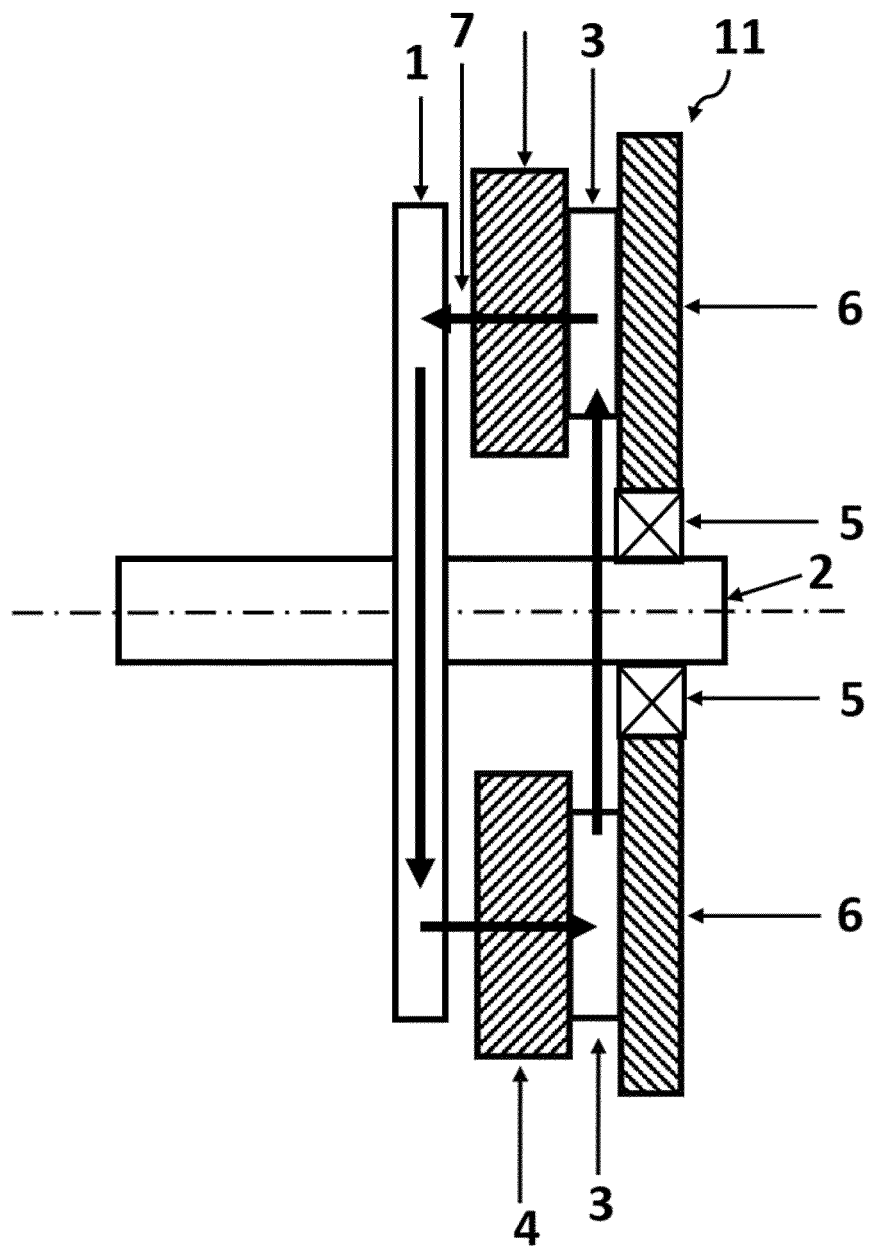
FIG. 7: A cross-sectional view through a schematic axial flux electrical machine with single-sided design with one active stator, wherein black arrows schematically indicate the magnetic flux.
Figure 8:
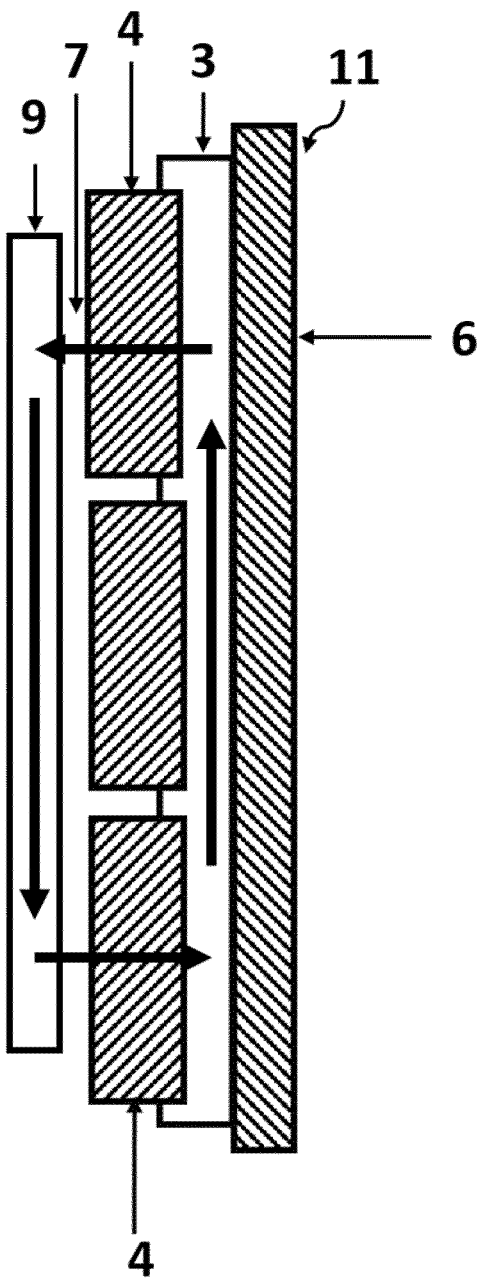
FIG. 8: A cross-sectional view through a schematic linear electrical machine with one active stator, wherein black arrows schematically indicate the magnetic flux.
Figure 9:
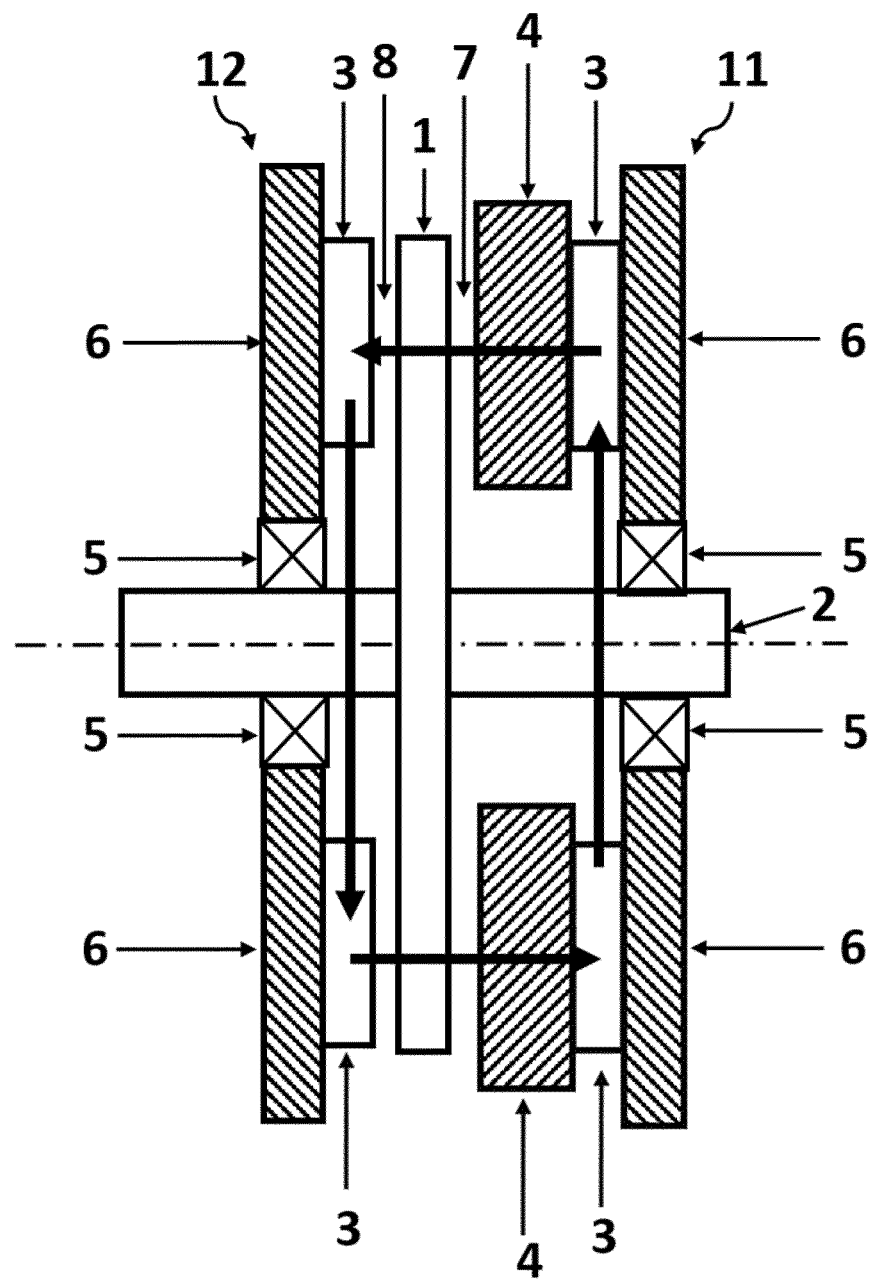
FIG. 9: A cross-sectional view through a schematic axial flux electrical machine according to the invention, wherein black arrows schematically indicate the magnetic flux.
Figure 10:
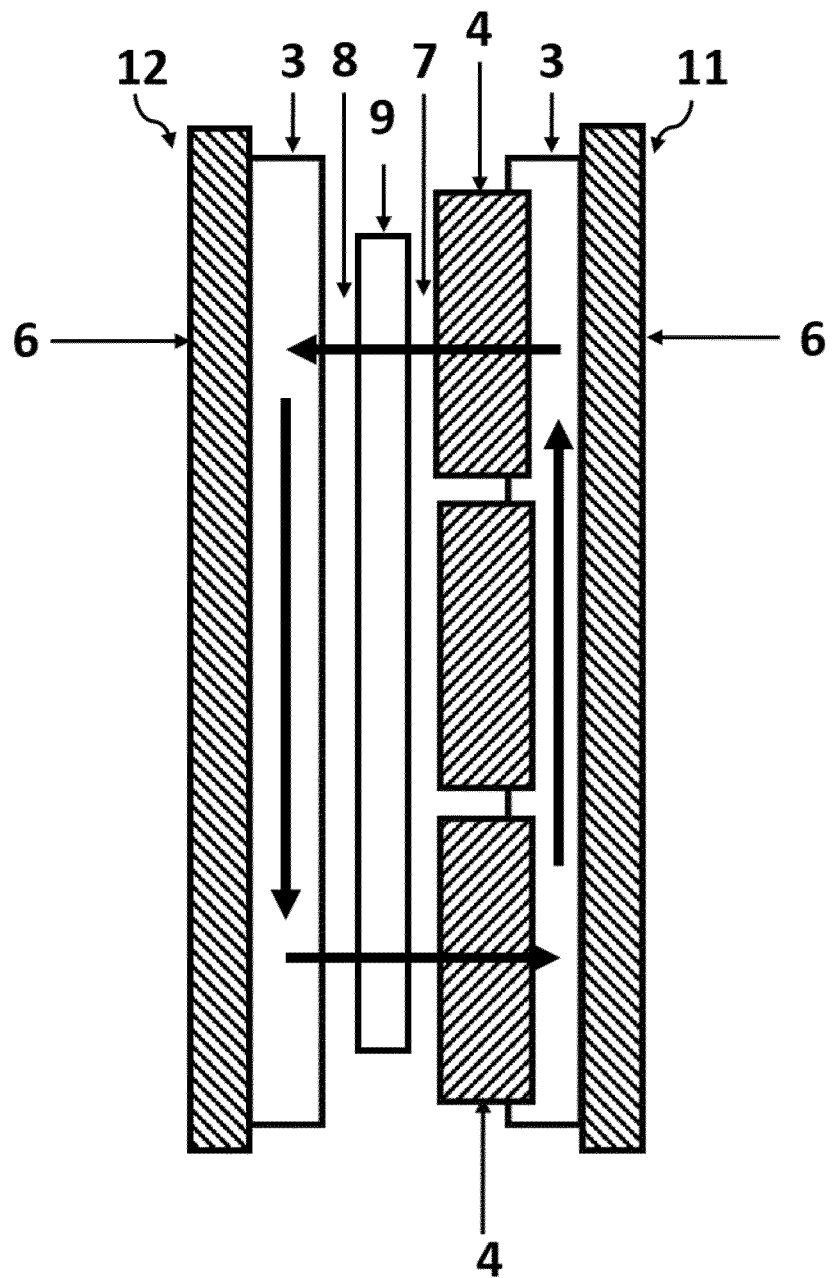
FIG. 10: A cross-sectional view through a schematic linear electrical machine according to the invention, wherein black arrows schematically indicate the magnetic flux.

FIGS. 5 and 6 disclose electrical machines according to the invention, wherein FIG. 5 shows an axial flux electrical machine having a rotor 1 connected to a shaft 2 while FIG. 6 shows a linear electrical machine having a slider 9. Furthermore, FIGS. 9 and 10 qualitatively indicate the magnetic flux in the respective electrical machines. Hereinafter, the invention and the underlying inventive concept of the passive stator will be explained in detail for FIG. 5.

FIG. 5 shows a cross-sectional view through an axial flux electrical machine that on its right side comprises a first stator 11 comprising a stator core 3 and a plurality of windings 4. A movable element, that is a rotor 1, is rotatably mounted adjacent to the first stator 11 to form a first air gap 7 between the rotor 1 and the windings 4 of the first stator 11. The rotor 1 is connected to a shaft 2. On the left side of the rotor 1, a second stator 12 comprising a stator core 3 is arranged opposite to the first stator 11 on the other side of the rotor 1, wherein the rotor 1 is rotatably mounted adjacent to the second stator 12 to form a second air gap 8 between the rotor 1 and the stator core 3 of the second stator 12.

In FIG. 5 the first stator 11, the second stator 12 and the rotor 1 are arranged so that during operation of the electrical machine the magnetic flux passes from the first stator 11, more precisely from its stator core 3, through the first air gap 7, through the rotor 1 and through the second air gap 8 to the second stator 12, more precisely to its stator core 3, wherein the second stator 12, more precisely its stator core 3, acts as a return path for the magnetic flux. This is visualized in FIG. 9.

In FIG. 5 the second stator 12 comprises no windings 4 on the surface facing the rotor 1 and the rotor 1 comprises no yoke as return path for the magnetic flux. Furthermore, in the exemplary embodiment the rotor 1 comprises a plurality of permanent magnets, that are arranged so that the polarity of each is opposite that of each immediately neighbouring magnet. In this example, the rotor 1 is flat and comprises a disk with apertures for housing the permanent magnets, wherein the disk restricts the movement of the permanent magnets in axial and radial direction. The rotor 1 is for example made from a non-magnetic composite material.

In FIG. 5 the shaft 2 extends through the first 11 and second stator 12, wherein the first 11 and second stator 12 are connected to the shaft 2 with a roller bearing 5, to allow rotation of the shaft 2 and the rotor 1 relative to the first 11 and second stator 12.

It can be seen from FIG. 5 that the faces of the first 11 and second stator 12 that are facing the rotor 1 and both faces of the rotor 1 are parallel to each other. The cooling plates 6 that are shown in FIG. 5 are means for cooling the electrical machine.

In the embodiment of the invention depicted in FIG. 5, the rotor 1 is only separated from the windings 4 of the first stator 11 by the first air gap 7 and only separated from the stator core 3 of the second stator 12 by the second air gap 8, so that during operation the magnetic flux passes through the first 7 and second air gap 8 as well as the rotor 1 without passing through any additional condensed matter.

In FIG. 5, the windings 4 are for example windings 4 of an electrical conductor that comprise copper and iron, that are electrically connected with a power source, wherein the windings 4 are for example arranged on the surface of the first stator 11 with C12 rotational symmetry.

Figure 11:
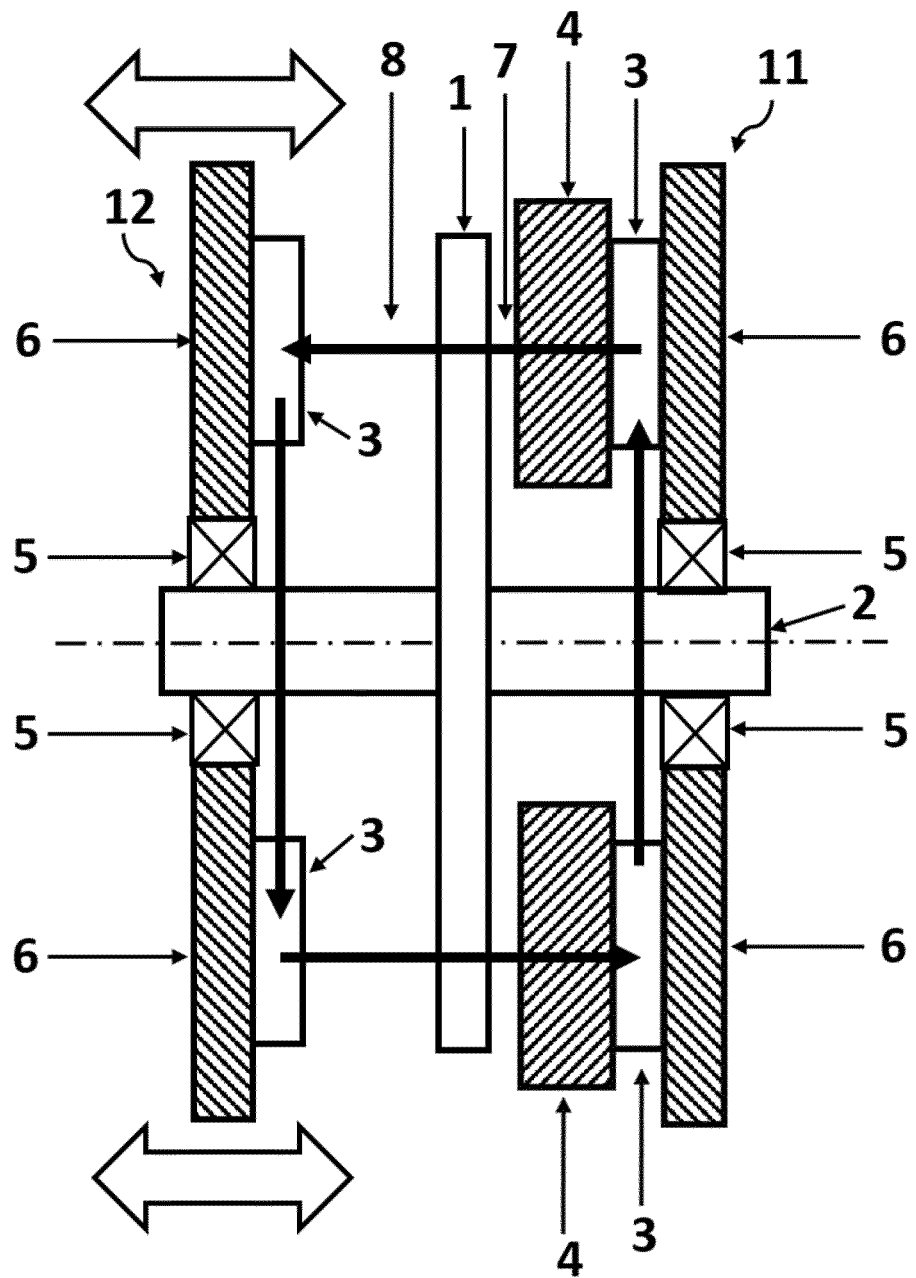
FIG. 11: A cross-sectional view through a schematic axial flux electrical machine according to the invention with a movable passive stator, wherein black arrows schematically indicate the magnetic flux.
Figure 12:
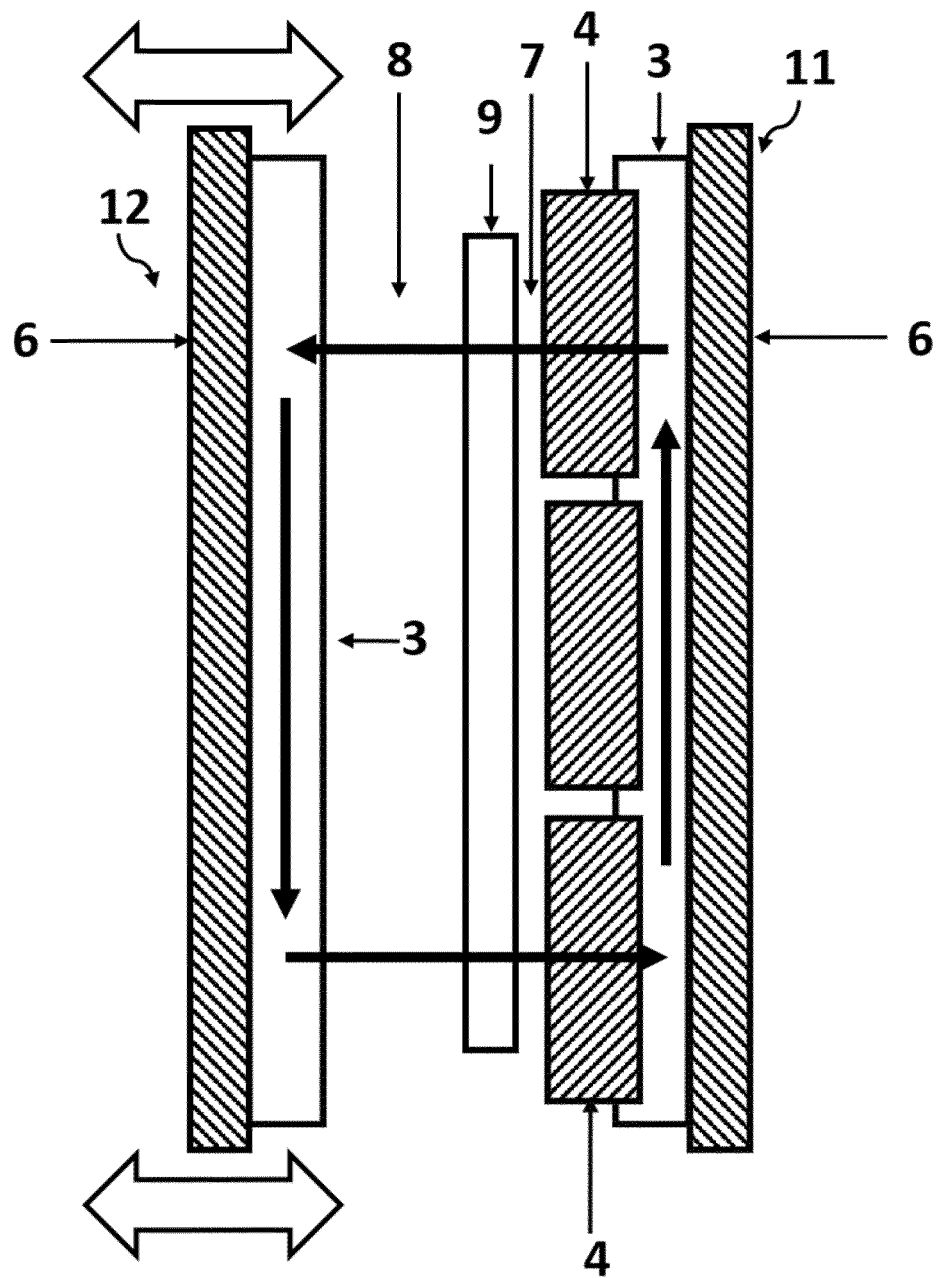
FIG. 12: A cross-sectional view through a schematic linear electrical machine according to the invention with a movable passive stator, wherein black arrows schematically indicate the magnetic flux.

FIGS. 11 and 12 show electrical machines according to the invention wherein the magnetic reluctance of the first air gap 7 and the second air gap 8 is modified by varying the distance between the second stator 12 and the rotor 1 or the slider 9, respectively.

REFERENCE SIGNS

1 Rotor
2 Shaft
3 Stator core
4 Winding
5 Bearing
6 Cooling plate
7 First air gap
8 Second air gap
9 Slider
11 First stator
12 Second stator

What is claimed is:

1. An electrical machine comprising:
a first stator comprising a first stator core and a plurality of windings, and
a movable element that is movably mounted adjacent to the first stator to form a first air gap between the movable element and the windings of the first stator,
wherein the movable element is a slider or a rotor that is connected to a shaft,
wherein a second stator comprising a second stator core, the second stator is arranged opposite to the first stator on the other side of the movable element,
wherein the movable element is movably mounted adjacent to the second stator to form a second air gap between the movable element and the second stator core of the second stator, and
wherein the first stator, the second stator, and the movable element are arranged so that during operation of the electrical machine the magnetic flux passes from the first stator through the first air gap, through the movable element, and through the second air gap to the second stator,
wherein the second stator acts as a return path for the magnetic flux,
wherein the second stator comprises no windings on the surface facing the movable element.

2. The electrical machine according to claim 1, wherein the movable element does not comprise a yoke as return path for the magnetic flux.

3. The electrical machine according to claim 1, wherein the electrical machine is an axial flux electrical machine, wherein the movable element is the rotor that is connected to a shaft and rotatably mounted between the first stator and the second stator,
or
wherein the electrical machine is a linear electrical machine, wherein the movable element is the slider that is movably mounted between the first stator and the second stator.

4. The electrical machine according to claim 1, wherein the movable element comprises two or more permanent magnets, wherein the permanent magnets are arranged so that the polarity of each is opposite that of each immediately neighboring magnet,
and
wherein the movable element is flat and comprises a structure for housing permanent magnets, the structure being a disk or plate with apertures for housing permanent magnets,
wherein the disk or plate is designed to restrict the movement of the permanent magnets in an axial direction or a radial direction.

5. The electrical machine according to claim 1, wherein the movable element is the rotor that is connected to a shaft, wherein the shaft extends through the first or second stator, wherein the first or second stator is connected to the shaft with a roller bearing to allow rotation of the shaft and the rotor relative to the first or second stator,
or
wherein the stator core of the first or second stator comprises one or more materials selected from the group consisting of non-oriented and grain-oriented metal and soft magnetic material, a non-oriented electrical steel or a grain-oriented electrical steel,
or
wherein the stator core of the first stator or the second stator is ring-shaped.

6. The electrical machine according to claim 1, wherein the respective faces of the first stator and the second stator are facing the movable element and both faces of the movable element are parallel to each other.

7. The electrical machine according to claim 1,
wherein the second stator is designed so that the distance between the second stator and the movable element can be varied during operation of the electrical machine, or
wherein the second stator is designed so that the distance between a first portion of the second stator and the movable element can be varied during operation of the electrical machine, independent from the distance between a second portion of the second stator and the movable element.

8. The electrical machine according to claim 1, wherein the first stator or the second stator comprises means for cooling the electrical machine, the means being cooling plates or isolating elements or parts of a fluid-based cooling system.

9. The electrical machine according to claim 1, wherein the movable element is only separated from the windings of the first stator by the first air gap and only separated from the stator core of the second stator by the second air gap, so that during operation the magnetic flux passes through the first air gap and the second air gap as well as the movable element without passing through any additional condensed matter.

10. The electrical machine according to claim 1,
wherein the windings are windings of an electrical conductor that comprise copper and iron,
wherein the windings are electrically connected with a power source,
wherein the windings are arranged on the surface of the first stator with symmetry selected from the group of a C2 rotational symmetry or higher or a C6 rotational symmetry or higher.

11. The electrical machine according to claim 1, wherein the second stator comprises at least one sensor unit, or
wherein the second stator comprises at least sensor unit that is selected from the group of a temperature sensor or a hall sensor.

12. The electrical machine according to claim 1, wherein the average distance between the movable element and the first stator that is measured at the circumference of the movable element, changes by less than 5%,
or
wherein the axial attraction force between the movable element and the first stator is less than 500 N.

13. The electrical machine according to claim 1, wherein the electrical machine is designed to generate a torque of 200 Nm or more, and wherein the axial flux electrical machine has a power to volume ratio of 20 kW/L or more.

14. A method of controlling the operation of an electrical machine according to claim 1, comprising the steps of:
varying the distance between the second stator and the movable element during operation of the electrical machine in order to control the air gap magnetic flux,
or
varying the distance between a first portion of the second stator and the movable element during operation of the electrical machine, independent from the distance between a second portion of the second stator and the movable element.

15. A vehicle comprising:
the electrical machine according to claim 1.

16. The electrical machine according to claim 1,
wherein the movable element is flat and comprises a structure for housing permanent magnets, the structure being a disk or plate with apertures for housing permanent magnets,
wherein the disk or plate is designed to restrict the movement of the permanent magnets in an axial direction or a radial direction, wherein the disk or plate comprises magnetic material in a percentage by weight selected from the group of 30% by weight of magnetic material, less than 10%, or no magnetic material.

17. The electrical machine according to claim 1, wherein the movable element comprises two or more permanent magnets, wherein the permanent magnets are arranged so that the polarity of each is opposite that of each immediately neighboring magnet.

18. The electrical machine according to claim 1, wherein the movable element is the rotor that is connected to a shaft, wherein the shaft extends through the first stator or the second stator, wherein the first or second stator is connected to the shaft with a roller bearing, to allow rotation of the shaft and the rotor relative to the first stator or the second stator,
and
wherein the stator core of the first or second stator comprises one or more materials selected from the group consisting of non-oriented and grain-oriented metal and soft magnetic material, a non-oriented or grain-oriented electrical steel, or a grain-oriented electrical steel,
and
wherein the first stator core of the first stator or second stator core of the second stator is ring-shaped.

19. The electrical machine according to claim 1, wherein the movable element is the rotor that is connected to a shaft, wherein the shaft extends through the first or second stator, wherein the first stator or the second stator is connected to the shaft with a roller bearing, to allow rotation of the shaft and the rotor relative to the first stator or the second stator,
and wherein the first stator core of the first stator or the second stator core of the second second stator comprises one or more materials selected from the group consisting of non-oriented and grain-oriented metal and soft magnetic material, a non-oriented or grain-oriented electrical steel, or a grain-oriented electrical steel.

20. The electrical machine according to claim 1, wherein the first stator core of the first stator or the second stator core of the second stator comprises one or more materials selected from the group consisting of non-oriented and grain-oriented metal and soft magnetic material, a non-oriented or grain-oriented electrical steel, or a grain-oriented electrical steel, and wherein the first stator core of the first stator or the second stator core of the second second stator is ring-shaped.

* * * * *